United States Patent
Tang et al.

(10) Patent No.: US 9,811,721 B2
(45) Date of Patent: Nov. 7, 2017

(54) THREE-DIMENSIONAL HAND TRACKING USING DEPTH SEQUENCES

(71) Applicant: Apple Inc., Cupertino, CA (US)

(72) Inventors: Feng Tang, Cupertino, CA (US); Ang Li, Cupertino, CA (US); Xiaojin Shi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/706,649

(22) Filed: May 7, 2015

(65) Prior Publication Data
US 2016/0048726 A1    Feb. 18, 2016

Related U.S. Application Data

(60) Provisional application No. 62/037,923, filed on Aug. 15, 2014.

(51) Int. Cl.
*G06K 9/00* (2006.01)
*H04N 13/02* (2006.01)
(Continued)

(52) U.S. Cl.
CPC ......... *G06K 9/00355* (2013.01); *G06F 3/017* (2013.01); *G06F 3/0304* (2013.01);
(Continued)

(58) Field of Classification Search
None
See application file for complete search history.

(56) References Cited

U.S. PATENT DOCUMENTS 7,340,077 B2    3/2008 Gokturk
7,613,313 B2    11/2009 Juppi
(Continued)

FOREIGN PATENT DOCUMENTS

EP    2648425 A1    10/2013

OTHER PUBLICATIONS

Jamie Shotton et al: "Real-time human pose recognition in parts from single depth images," Communications of teh ACM, Association for Computing Machinery, ICN, United States, vol. 56, No. 1, Jan. 1, 2013 (Jan. 1, 2013), pp. 116-124, XP058010058, ISSN: 0001/0782, DOI: 10.1145/2398356.2398381.
(Continued)

*Primary Examiner* — Hadi Akhavannik
(74) *Attorney, Agent, or Firm* — Blank Rome, LLP

(57) ABSTRACT

In the field of Human-computer interaction (HCI), i.e., the study of the interfaces between people (i.e., users) and computers, understanding the intentions and desires of how the user wishes to interact with the computer is a very important problem. The ability to understand human gestures, and, in particular, hand gestures, as they relate to HCI, is a very important aspect in understanding the intentions and desires of the user in a wide variety of applications. In this disclosure, a novel system and method for three-dimensional hand tracking using depth sequences is described. Some of the major contributions of the hand tracking system described herein include: 1.) a robust hand detector that is invariant to scene background changes; 2.) a bi-directional tracking algorithm that prevents detected hands from always drifting closer to the front of the scene (i.e., forward along the z-axis of the scene); and 3.) various hand verification heuristics.

20 Claims, 12 Drawing Sheets

(51) Int. Cl.
*G06K 9/46* (2006.01)
*G06F 3/01* (2006.01)
*G06F 3/03* (2006.01)
*G06F 3/042* (2006.01)
*G06T 7/246* (2017.01)
*G06T 7/254* (2017.01)
*H04N 13/00* (2006.01)

(52) U.S. Cl.
CPC ......... *G06F 3/0425* (2013.01); *G06K 9/4609* (2013.01); *G06T 7/246* (2017.01); *G06T 7/254* (2017.01); *H04N 13/0207* (2013.01); *H04N 13/0271* (2013.01); *G06T 2200/04* (2013.01); *G06T 2207/30196* (2013.01); *H04N 2013/0085* (2013.01)

(56) References Cited

U.S. PATENT DOCUMENTS

| | | | |
|---|---|---|---|
| 8,103,109 B2 | 1/2012 | Winn | |
| 8,315,400 B2 | 11/2012 | Goldstein | |
| 8,351,651 B2 | 1/2013 | Lee | |
| 8,582,867 B2 | 11/2013 | Litvak | |
| 8,761,437 B2 | 6/2014 | Kirovski | |
| 8,788,973 B2 | 7/2014 | Lavigne | |
| 8,823,484 B2 | 9/2014 | Kennedy | |
| 8,878,906 B2* | 11/2014 | Shotton | H04N 13/0203 348/46 |
| 9,117,281 B2 | 8/2015 | Hoiem | |
| 9,135,392 B2 | 9/2015 | Raschke | |
| 9,147,123 B2 | 9/2015 | Zeng | |
| 9,383,895 B1* | 7/2016 | Vinayak | G06F 3/017 |
| 2008/0013793 A1* | 1/2008 | Hillis | G03H 1/0005 382/114 |
| 2008/0317331 A1 | 12/2008 | Winn | |
| 2011/0206273 A1* | 8/2011 | Plagemann | G06K 9/00342 382/154 |
| 2011/0293180 A1* | 12/2011 | Criminisi | G06K 9/38 382/173 |
| 2012/0168001 A1 | 7/2012 | Zhang | |
| 2012/0225719 A1 | 9/2012 | Nowozin | |
| 2012/0309532 A1 | 12/2012 | Ambrus | |
| 2013/0107010 A1 | 5/2013 | Hoiem | |
| 2013/0322762 A1 | 12/2013 | Zeng | |
| 2013/0336524 A1 | 12/2013 | Zhang | |
| 2014/0118335 A1 | 5/2014 | Gurman | |
| 2014/0204013 A1 | 7/2014 | OPrey | |
| 2014/0232631 A1 | 8/2014 | Fleischmann | |
| 2014/0375782 A1 | 12/2014 | Chichilnisky | |
| 2015/0117708 A1 | 4/2015 | Guigues | |
| 2015/0324692 A1 | 11/2015 | Ritchey | |

OTHER PUBLICATIONS

Vieriu, et al., "Background Invariant Static Hand Gesture Recognition based on Hidden Markov Models," International Symposium on Signals, Circuits and Systems (ISSCS), Trento, Italy, Jul. 11-12, 2013.

* cited by examiner

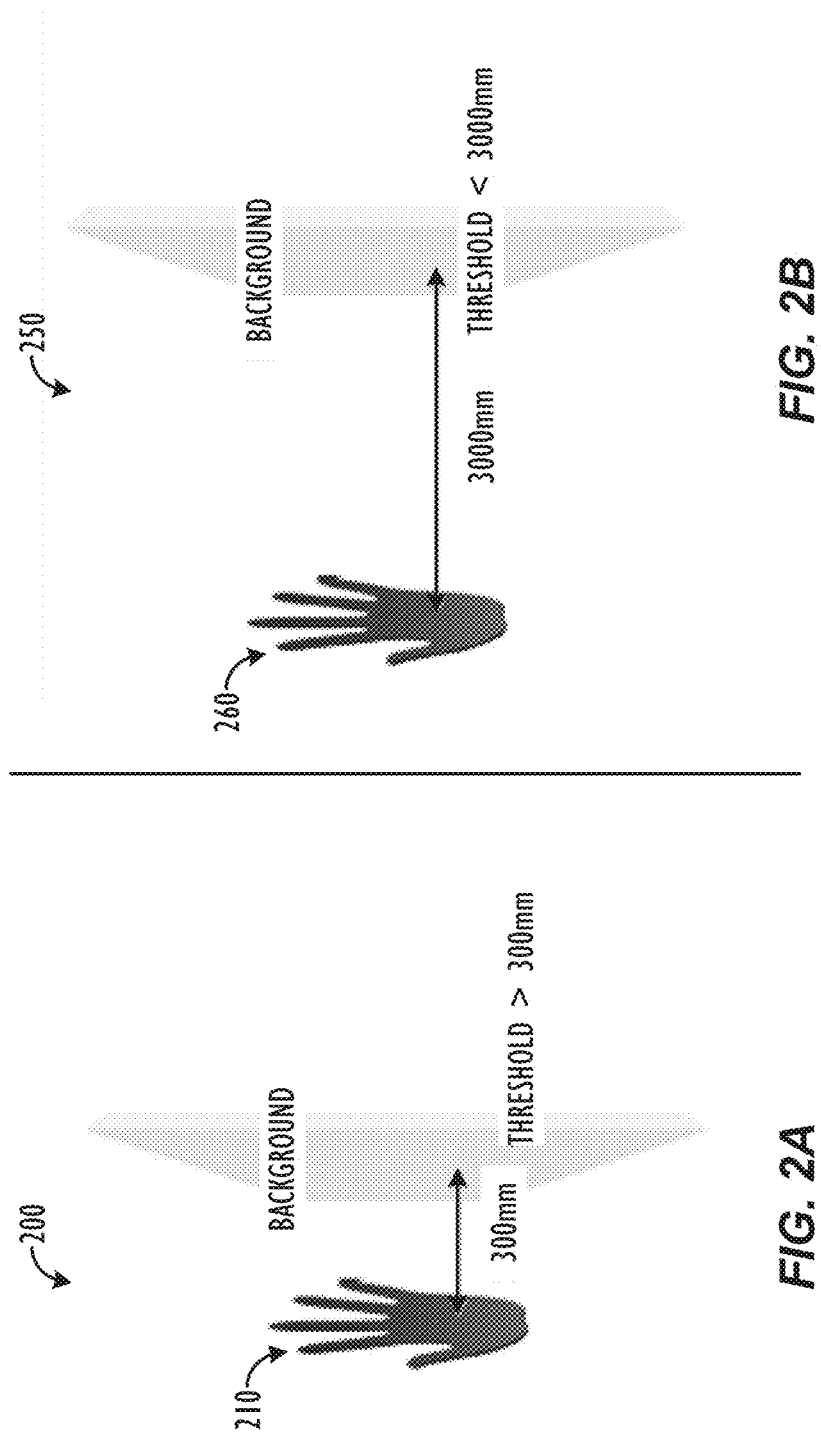

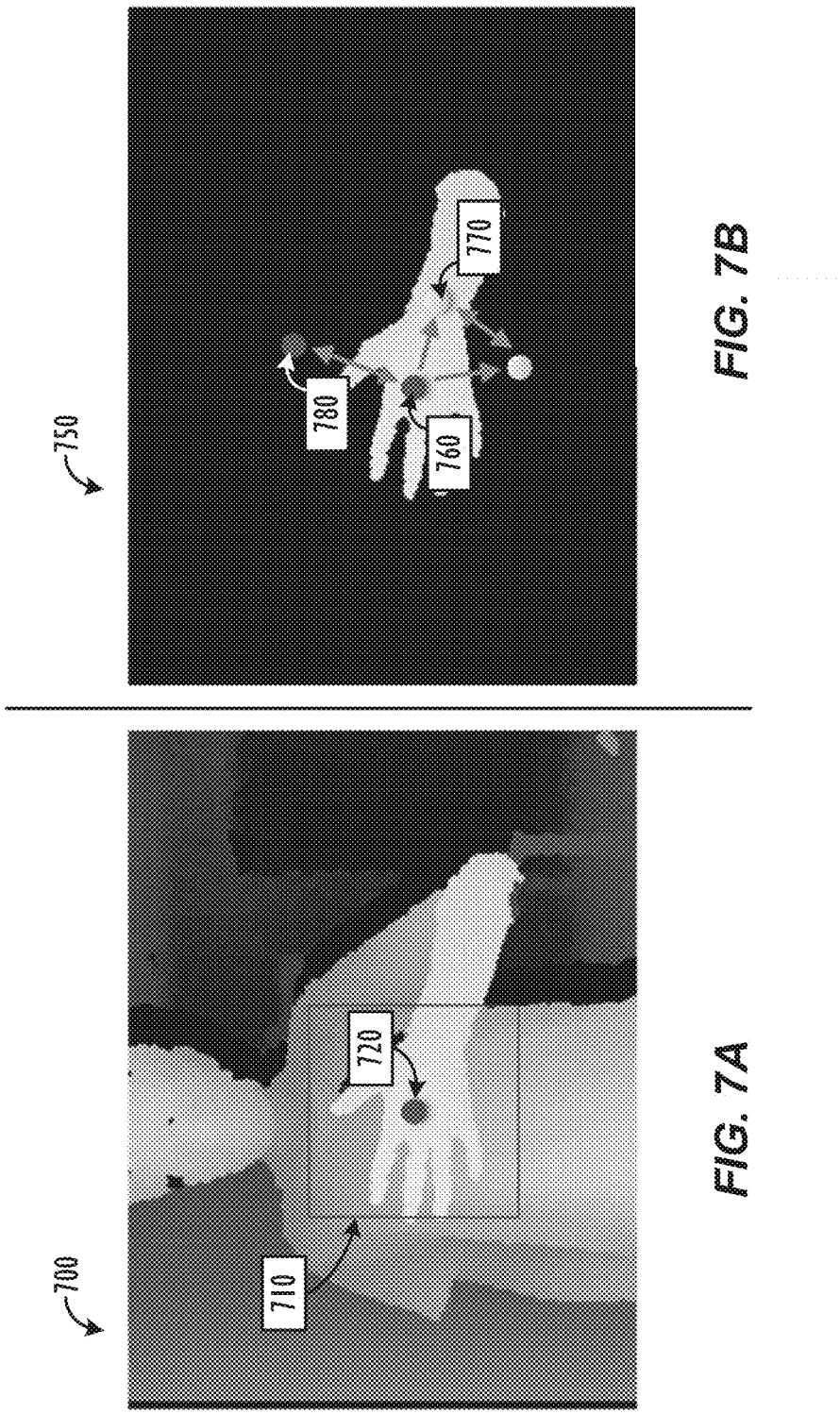

THREE-DIMENSIONAL HAND TRACKING USING DEPTH SEQUENCES

CROSS-REFERENCE TO RELATED APPLICATION

This application claims the benefit of U.S. Provisional Patent Application 62/037,923, filed Aug. 15, 2014, which is incorporated herein by reference.

TECHNOLOGY FIELD

This disclosure relates generally to the field of computer vision and machine learning, and, more particularly, to three-dimensional hand tracking using depth sequences.

BACKGROUND

In the field of Human-computer interaction (HCI), i.e., the study of the interfaces between people (i.e., users) and computers, understanding the intentions and desires of how the user wishes to interact with the computer is a very important problem. When handled properly, HCI enables user-friendly interactions, e.g., via multi-modal inputs, such as: voice, touch, body gestures, graphical user interfaces (GUIs), and other input peripherals, such as keyboard, mice, styluses, etc.

The ability to understand human gestures, and, in particular, hand gestures, as they relate to HCI, is a very important aspect in understanding the intentions and desires of the user in a wide variety of applications. In this disclosure, a novel system and method for three-dimensional hand tracking is described.

Existing hand tracking applications typically rely on "depth maps" in some fashion. A number of different methods and systems are known in the art for creating depth maps, some of which are described, e.g., in the commonly-assigned U.S. Pat. No. 8,582,867 ("the '867 patent"), which is hereby incorporated by reference in its entirety. In the present patent application, the term "depth map" will be used to refer to the representation of a scene as a two-dimensional matrix of pixels, in which each pixel corresponds to a respective location in the scene and has a respective pixel depth value, indicative of the distance from a certain reference location to the respective scene location. In other words, the depth map has the form of an image in which the pixel values indicate topographical information, rather than brightness and/or color of the objects in the scene. Depth maps may equivalently be referred to herein as "3D maps," "depth images," "depth sequences," or "3D images."

Depth maps may be processed in order to segment, identify, and localize objects and their components in the scene. In particular, descriptors (e.g., so-called "features," as will be discussed in further detail below) may be extracted from the depth map based on the depth values of the pixels in a plurality of patches (i.e., areas) distributed in respective positions over objects in the scene that are trying to be identified (e.g., a human hand). Identification of humanoid forms (i.e., 3D shapes whose structure resembles that of parts of a human being) in a depth map, and the exact poses of these parts, which may change from frame to frame, may be used as a means for controlling computer applications.

As will be described further herein, novel techniques have been developed by the inventors to: detect, track, and verify the presence and location of human hands within a video stream of image data by leveraging background-invariant depth image features and bi-directional tracking heuristics.

SUMMARY

Described herein are various methods, devices, and computer readable media for three-dimensional hand tracking using depth sequences. Some of the major contributions of the hand tracking system described herein include: 1.) a robust hand detector that is invariant to scene background changes; 2.) a bi-directional tracking algorithm that prevents detected hands from always drifting closer to the front of the scene (i.e., forward along the z-axis of the scene); and 3) various hand verification heuristics.

A Robust Hand Detector Using a Background-Invariant Decision Forest

The traditional way of building an object detector, e.g., a hand detector, with depth maps typically involves measuring the depth difference between sample point pairs of pixels within a sample image(s), i.e., a "feature," and then training a feature classifier, e.g., a random forest classifier, based on these features. Several examples of such features are shown in FIG. 1A and FIG. 1B, as will be discussed in further detail below. In order for the features to capture the desired object's shape, it is typically required that one pixel in the feature pixel pair lies on the object and the other pixel is in the background of the scene. However, this kind of classifier training requires a very large amount of test images, with the objects of interest (e.g., hands) being positioned a various depths with respect to the background—and in front of many different background types—if it is to be able to successfully handle such variations in a real-world detector scenario.

Thus, embodiments described herein comprise human hand tracking systems using background-invariant feature detectors. According to such embodiments, a rough background segmentation is applied to each pixel in the image based on the pixel's depth. When pixel pairs are sampled, the feature classifier is used to detect if one of the pixels is in the scene background. Based on the distribution of the pixels in each pair, i.e., whether the pair of pixels are in the scene background or foreground, the pixel pairs are labelled with different labels (e.g., 'foreground-foreground,' foreground-background; or 'background-background') so that they may be treated accordingly, if so desired. This makes the feature detector invariant to different depth values between pixels in the test pixel pair. When building the random forest classifier, these labels—together with the feature values—are then used to decide which features to use for splitting the tree. The features that are later extracted from an input depth sequence image are then matched to the previously-stored features in the background-invariant decision forest in order to estimate the position of a hand in the scene.

A Bi-Directional Hand Tracking Algorithm

Further embodiments described herein comprise bi-directional hand tracking systems. Traditional prior art hand tracking systems assume that the detected hand is always closer to the image sensor capturing the scene than the rest of the user's body, and thus move the detected hand's presumed location from the previous frame to the current frame based on a weighted average of the depth values of the pixels. The weights are decided based on how far a pixel is to the origin, i.e., the center of the scene in three-dimensional space. When the assumption about the depth of the hand being closer to the front of the scene than the rest of the body is not true, however, such prior art hand trackers will typically drift away from the actual hand location and forward to the user's shoulder area, as will be discussed in greater detail in reference to FIG. 3A. By contrast, the bi-directional hand tracking system embodiments described herein leverage the fact that the hand is at the end of a body part (i.e., the arm) in order to make the tracker track in two directions, using a novel weighting scheme that allows the tracker to follow the hand—even when it moves behind (i.e., deeper along the scene's z-axis) the user's arm.

Single-Directional Connectivity

Further embodiments described herein comprise bi-directional hand tracking systems that employ a single-directional connectivity verification step to eliminate several classes of common false positives seen by hand detectors. As will be described in further detail below, according to some embodiments, such systems will employ constraints as to both: 1.) the number of pairwise transitions between foreground and background boundaries along the circumference of a circle centered upon the location of the hand candidate; and 2.) the distance between such foreground/background boundary pairs along the circumference of the circle centered at the location of the hand candidate. These additional constraints will enforce a single-directional connectivity from the torso/body of the user to the located hand candidates (i.e., that the candidate hand is connected to the torso/body mass of the individual in only a single direction—usually the forearm—as opposed to zero directions or more than one direction), ruling out common false positive locations, such as the forearm and torso.

Thus, according to one embodiment described herein, an apparatus is disclosed, comprising: a depth-sensing camera; a memory having, stored therein, computer program code; and one or more processing units operatively coupled to the memory and configured to execute instructions in the computer program code that cause the one or more processing units to: receive a depth map of a scene containing at least one human hand from the depth-sensing camera, the depth map comprising a matrix of pixels, each pixel having a depth value; extract, from the depth map, descriptors based on the depth values of the pixels in a plurality of patches distributed in respective positions over the at least one human hand; match the extracted descriptors to previously-stored descriptors using a background-invariant decision forest; estimate a position of at least one of the at least one human hand based, at least in part, on stored information associated with the matched descriptors; and track the position of the at least one of the at least one human hand, wherein the instructions to track comprise instructions to track bi-directionally along a z-axis of the scene.

Still further embodiments include methods and non-transitory program storage devices, readable by a programmable control device and comprising instructions stored thereon to cause one or more processing units to implement the functionality described herein.

BRIEF DESCRIPTION OF THE DRAWINGS

FIG. 2A illustrates an exemplary hand at a first distance from a scene background.

FIG. 2B illustrates an exemplary hand at a second distance from a scene background.

FIG. 7A illustrates an exemplary located hand candidate, in accordance with one embodiment.

FIG. 7B illustrates exemplary sample pixel pairs used to compute depth difference features from a depth map using a background-segmented input image, in accordance with one embodiment.

DESCRIPTION

Figure 1B:
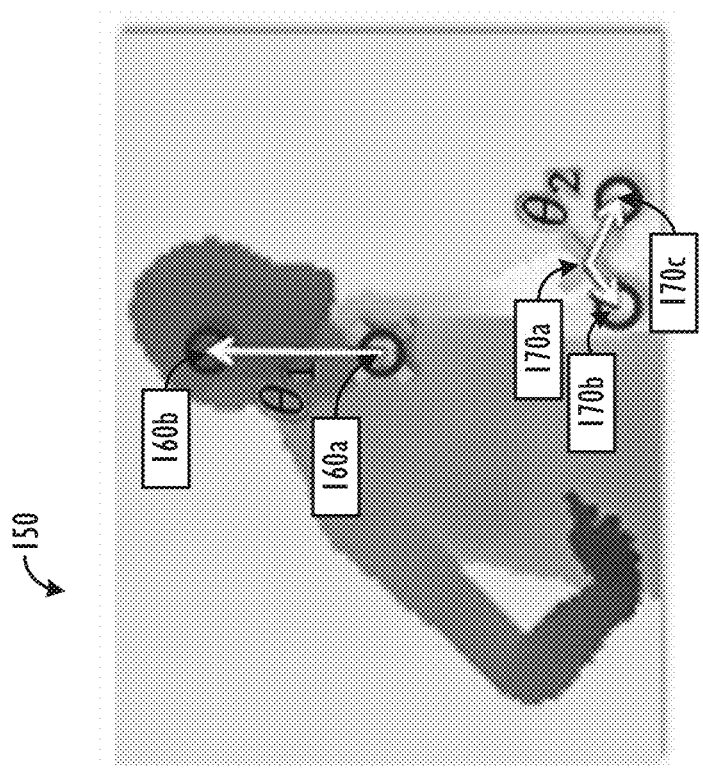
FIG. 1B illustrates exemplary sample pixel pairs used to compute depth difference features from a depth map, in accordance with some embodiments.

Systems, methods and program storage devices are disclosed, which provide instructions to cause one or more cameras and/or processing units to perform three-dimensional hand tracking using depth sequences. The techniques disclosed herein are applicable to any number of electronic devices with cameras and displays, such as: digital cameras, digital video cameras, mobile phones, personal data assistants (PDAs), portable music players, monitors, as well as desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Three dimensional hand tracking has many applications for the Human-computer Interaction (HCI) of the future. Many applications, e.g., touchless drawing, user interaction control, and sign language interaction, may benefit from the introduction of a robust hand tracking application that is able to find and track the three-dimensional location of hands throughout images in a video stream, as well as retain the identification (ID) of particular hands within the scene if there are multiple hands. More detailed applications of hand trackers, such as pose and gesture detections (e.g., by analyzing the positions of individual fingers on a hand) are also possible, but are not discussed in greater detail herein.

In any hand tracking application, the ideal outcome is for the number of "true positive" hands located to be as close as possible to the "ground truth" number of hands in the scene (i.e., the actual number of hands in the scene) at any moment, while simultaneously minimizing the number of "false positive" hands located. The innovations presented herein seek to decrease the false positive rate of prior art hand tracking solutions through the introduction and application of novel, hand-specific heuristics and tracking algorithms. Further, the hand tracking solutions presented herein do not require any specific hand gesture or positive feature identification to initiate the hand tracking, and will automatically be able to determine the correct number of hands to track in the image at any given time.

Hands are very unique objects, with particular characteristics and traits that other body parts do not have. For example: 1.) hands have a large amount of individual variation, but within a fixed number of degrees of freedom; 2.) hands are almost always connected to arms in the images captured by hand tracking application (however, in certain poses, it is possible that the position and/or location of the connected arm may be occluded by other body parts); and 3) hands have a certain size range that is typical at the distances such hand tracking applications will typically be employed.

Figure 1A:
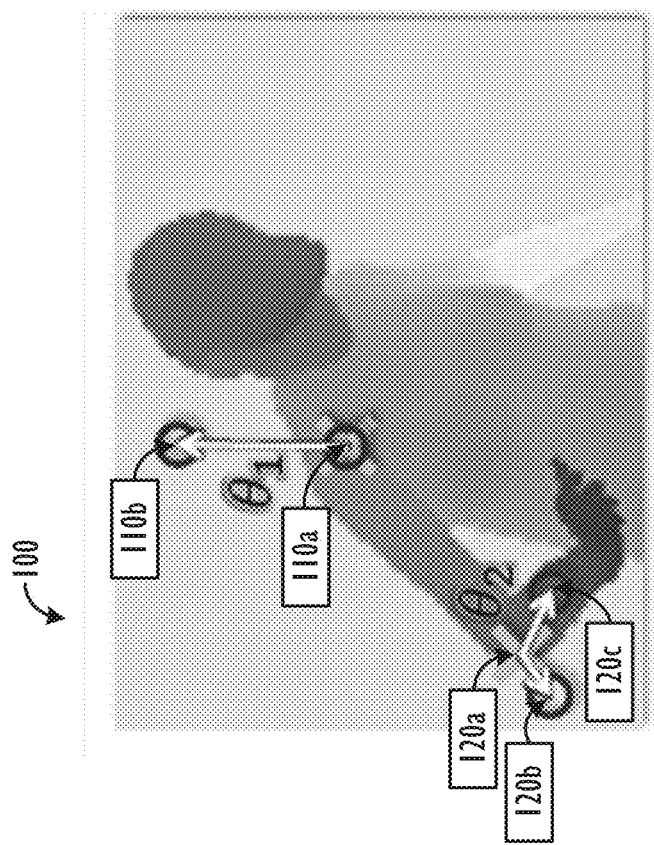
FIG. 1A illustrates exemplary sample pixel pairs used to compute depth difference features from a depth map, in accordance with some embodiments.

Referring now to FIG. 1A, exemplary sample pixel pairs that may be used to compute depth difference features from a depth map 100 are illustrated, in accordance with some embodiments. In FIG. 1A, the crosses 110a/120a represent the pixel, x, that is being classified. The circles 110b/120b/120c represent the "offset pixels," as defined in Eqn. 1 below:

$$f_\theta(I, x) = \begin{cases} d_I\left(x + \frac{u}{d_I(x)}\right) - d_I\left(x + \frac{v}{d_I(x)}\right) & \text{if } b(u) = 0 \text{ and } b(v) = 0 \\ dCons & \text{if } b(u) = 1 \text{ or } b(v) = 1 \end{cases}, \quad \text{(Eqn. 1)}$$

where $d_I(x)$ is the depth at pixel x in image I, and parameters $\theta=(u, v)$ describe offsets, u and v. The normalization of the offsets by $(1/d_I(x))$ ensures the features are depth invariant, i.e., at a given point on the body, a fixed world space offset will result whether the pixel is close to or far from the camera. If an offset pixel lies on the background, i.e., if the function b(u)=1 for either offset pixel, or is outside the bounds of the image, the feature $f_\theta(I,x)$ is given a large positive constant value, dCons.

The aforementioned background function, b(u), may be defined as is shown in Eqn. 2 below:

$$b(u) = \begin{cases} 0 & d_I\left(x + \frac{u}{d_I(x)}\right) - d_I(x) < \delta \\ 1 & d_I\left(x + \frac{u}{d_I(x)}\right) - d_I(x) >= \delta \end{cases}, \quad \text{(Eqn. 2)}$$

where $\delta$ is an implementation-specific predefined background distance threshold value. Eqn. 2 specifies that, if the depth distance difference between the offset pixel (i.e., the pixel at offset, u) and the pixel being evaluated (x) is less than the threshold value, $\delta$, then the offset pixel, u, is coded as non-background, or b(u)=0. Alternately, if the depth distance difference between the offset pixel (i.e., the pixel at offset, u) and the pixel being evaluated (x) is greater than or equal to the threshold value, $\delta$, then the offset pixel, u, is coded as background, or b(u)=1.

As may now be more clearly appreciated, in FIG. 1A, the two example features (110a/110b and 120b/120c) would give a large depth distance response, based on the fact that one pixel in each pair (110b and 120b, respectively) appears to lie in the scene background. However, because each pair has at least one pixel located in the background (see Eqn. 2), the depth distance for the feature will be assigned a predefined constant value, dCons (see Eqn. 1).

In FIG. 1B, the same two features at new image locations (160a/160b and 170b/170c) from depth map 150 give a much smaller depth distance response, based on the fact that the pixels in each pair appear to lie either both in the scene background (170a/170b) or both in the scene foreground (160a/160b).

FIGS. 1A and 1B illustrate two features at different pixel locations, x. Feature $f_{\theta 1}$ looks upwards. As such, Eqn. 1 will give a large positive response for pixels x near the top of the body, but a value close to zero for pixels x lower down the body. Feature $f_{\theta 2}$ may instead help find thin vertical structures, such as the arm. Individually, these features provide only a weak signal about which part of the body a given pixel belongs to, but, in combination in a decision forest, they are sufficient to accurately disambiguate all trained parts. As will be understood, in embodiments such as the ones disclosed herein, wherein the only body part being trained is the hand, only reference points on the hands of the training images need to be considered, and only those features (or feature combinations) which are best at predicting hand locations need to be considered. In other implementations, other body parts may be considered, such as the feature 110a/110b, shown on the shoulder of the user in FIG. 1A.

As mentioned above, in order for the features to capture the desired object's shape, it is typically required that one pixel in the feature pixel pair lies on the object and the other pixel is in the background of the scene. However, this kind of classifier training requires a very large amount of test images, with the objects of interest (e.g., hands) being positioned a various depths with respect to the background—and in front of many different background types—if it is to be able to successfully handle such variations in a real-world detector scenario.

For example, in order for the classifier to be able to detect hands as far away from the image sensor as 300 mm to the background (e.g., see hand 210 in scene 200 of FIG. 2A), in addition to hands as close to the image sensor as 3,000 mm to the background (e.g., see hand 260 in scene 250 of FIG. 2B), the classifier needs sufficient data from both scenarios to be in the training set. [Note: the distances shown in FIGS. 2A and 2B are merely exemplary, and do not imply or state an actual threshold that must be used in any embodiment.] In reality, the classifier will need to detect hands in front of many different kinds (shapes, colors, textures, etc.) of backgrounds as well, resulting in a huge amount of data needed for training.

Thus, the background invariant feature detector introduced above in Eqns. 1 and 2 provides a significant improvement on prior art hand tracking techniques. By applying a rough background segmentation for each pixel based on depth, when pixel pairs are sampled, the method is able to detect if one of the pixels is on the background. Then, based on the distribution of the whether each pixel in the pair is in the scene background or foreground, the two pixels are labeled with different labels. Finally, using a constant depth value for all pixels labeled as "background" makes the features more invariant to different depth variations at the locations of the pixel pair in the depth map of the image scene. As will be described in greater detail below, when building the random forest classifier, the background invariant feature is then used to decide how to construct individual trees.

According to some embodiments of a background aware decision forest described herein, if a pixel has depth greater than a threshold value, B, plus the current pixel depth, it is called a background pixel; otherwise, it is called a foreground pixel. As described above in reference to Eqn. 1, the feature is generally comprised of two pixels with offsets, referred to here as d1 and d2, wherein d1 has a 0.5 chance of being 0 and a 0.5 chance of being a random value in the range [−D, D], wherein D is a predetermined maximum distance that any single offset pixel in the image is allowed to be from the reference pixel to be considered to be on the same object. The second pixel offset, d2, may also be set to a random value over the range [−D, D].

The image feature may then be described as a triplet, (d1, d2, T, c), where c stands for 'class,' and is random over {0, 1, 2}, and T is a predefined threshold value, which is the splitting threshold on the depth difference feature in the trees that have been trained. If X is the current pixel, three cases indexed by c are considered: 1.) at least one nearby pixels are background pixels, i.e., depth(X+d1)−depth(X)>B or depth(X+d2)−depth(X)>B [known as case c=0]; 2.) both nearby pixels are foreground pixels, and depth(X+d1)−depth(X+d2)>=T [known as case c=1]; and 3.) both nearby pixels are foreground pixels, and depth(X+d1)−depth(X+d2)<T [known as case c=2].

The output of the feature is binary, which is 1 when (d1, d2, T) fulfills the condition, c, and otherwise 0. The reason for using an index, c, is to convert the three-way tree into a binary tree. Using a three-way tree would result in more redundancy in the tree structures and also create more difficulty in picking the best feature for each node.

Once computed, each pixel in the image will have a confidence value that defines that pixel's likelihood of being part of a hand. A confidence map may then be generated, wherein each entry in the map reflects a confidence value for whether a pixel in the image is part of a hand.

Figure 3B:
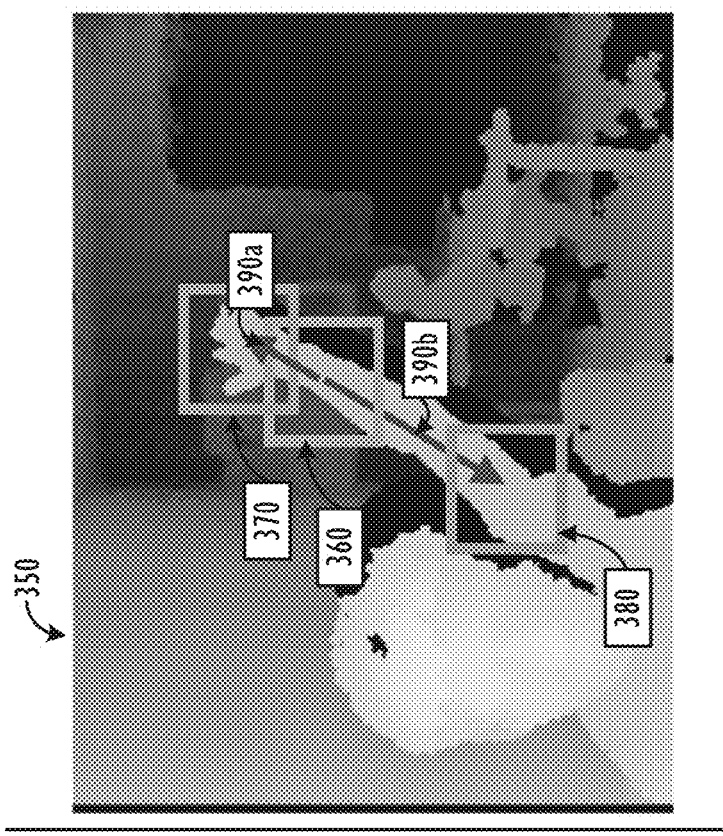
FIG. 3B illustrates an exemplary bi-directional hand tracker, in accordance with some embodiments.
Figure 3A:
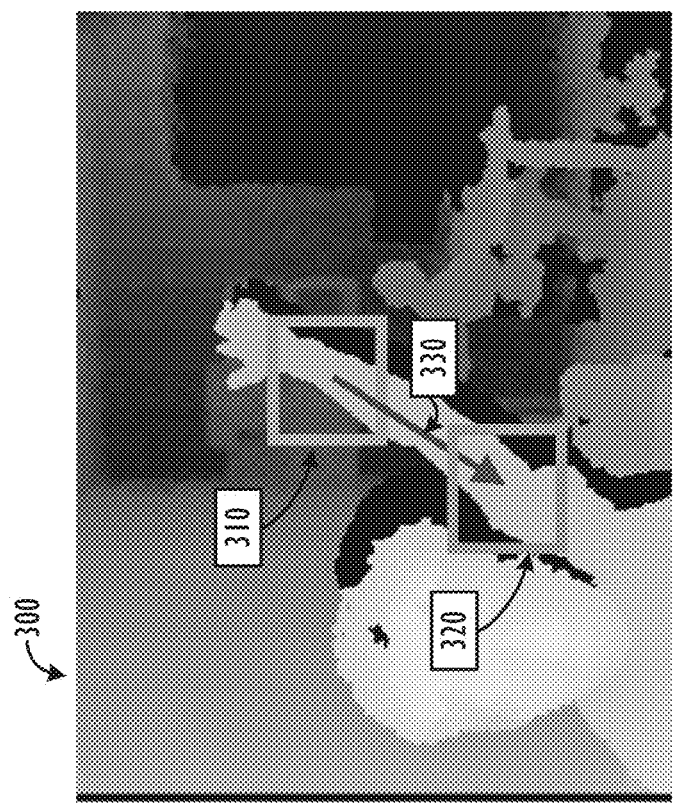
FIG. 3A illustrates an exemplary prior art uni-directional hand tracker.

FIG. 3A illustrates an exemplary prior art uni-directional hand tracker 300. During tracking, traditional hand tracking approaches assume the hand is closer to the sensor than the rest of the user's arm (and body), and thus move the hand location from previous frame (represented by box 310) to the current frame (represented by box 320), e.g., along path 330, based on a weighted value average reflecting how close a pixel is to the origin. When the assumption about the location of hand being closer to the sensor is not true, however, the tracker will drift to the shoulder area, as can be seen in box 320 of FIG. 3A.

FIG. 3B illustrates an exemplary bi-directional hand tracker 350, in accordance with some embodiments. In such embodiments, the hand tracker does not assume the hand is closer to the sensor than the rest of the user's arm (and body), and thus the hand location may be moved from previous frame (represented by box 360) to the current frame (represented by boxes 370/380), e.g., along paths 390a or 390b, respectively. In the example of FIG. 3B, the "verification stage" of the improved hand tracker (described in greater detail in reference to element 550 of FIG. 5) leverages the fact that the hand is at the end of the body part and uses this knowledge to allow the tracker to track in both directions 390a and 390b, while constraining the location of verified tracked hands to being at the extrema of a body part—in the case of tracked hands, the extrema of an arm (i.e., box 370)—rather than incorrectly drifting towards the user's shoulder (i.e., box 380). This functionality can be employed in all body pose situations, even when the hand is behind the arm in the scene.

Traditional hand tracking methods will determine the weight for each pixel as using the following equation:

$$w = \left(1 - \frac{Z - \text{mindepth}}{\text{Offset}}\right)^2, \quad \text{(Eqn. 3)}$$

where Z is the depth for each pixel, and mindepth is the minimal depth within the candidate region, i.e., the hand region predicted from the previous hand location. Offset is a normalization term. Weighting equations such as Eqn. 3 put much more weight to the closer pixels in the scene, thus resulting in hands never being tracked as they move farther away from the sensor (i.e., deeper) in the scene.

According to some embodiments disclosed herein, an improved weighting formula is used, as follows:

$$w = \left(1 - \frac{Z - \text{mindepth}}{\text{Offset}}\right)^2 * \frac{X * wx + Y * wy - \text{minXY}}{\text{Offset}}, \quad \text{(Eqn. 4)}$$

where X, Y, and Z are the 3D coordinates of the pixel, minXY is the reference for the point (i.e., the smallest depth value within the candidate region), and offset is the normalization factor. wx and wy are the weights for the x and y directions. As may be seen, Eqn. 4 computes a weighted center of mass based on the various weights, and then moves the candidate hand tracking box to the newly-computed center of mass location. In some embodiments, an iterative process is used, wherein, at the current reference pixel location, a depth value average of surrounding pixels is taken, a weighted center is located, and then the tracking box jumps to the determined weighted center. This process is then repeated iteratively until an extrema is reached. In some embodiments, when the movement distance between consecutive tracking box jumps goes below a minimum threshold value, the tracking box is deemed to be at an extrema location.

Figure 4:
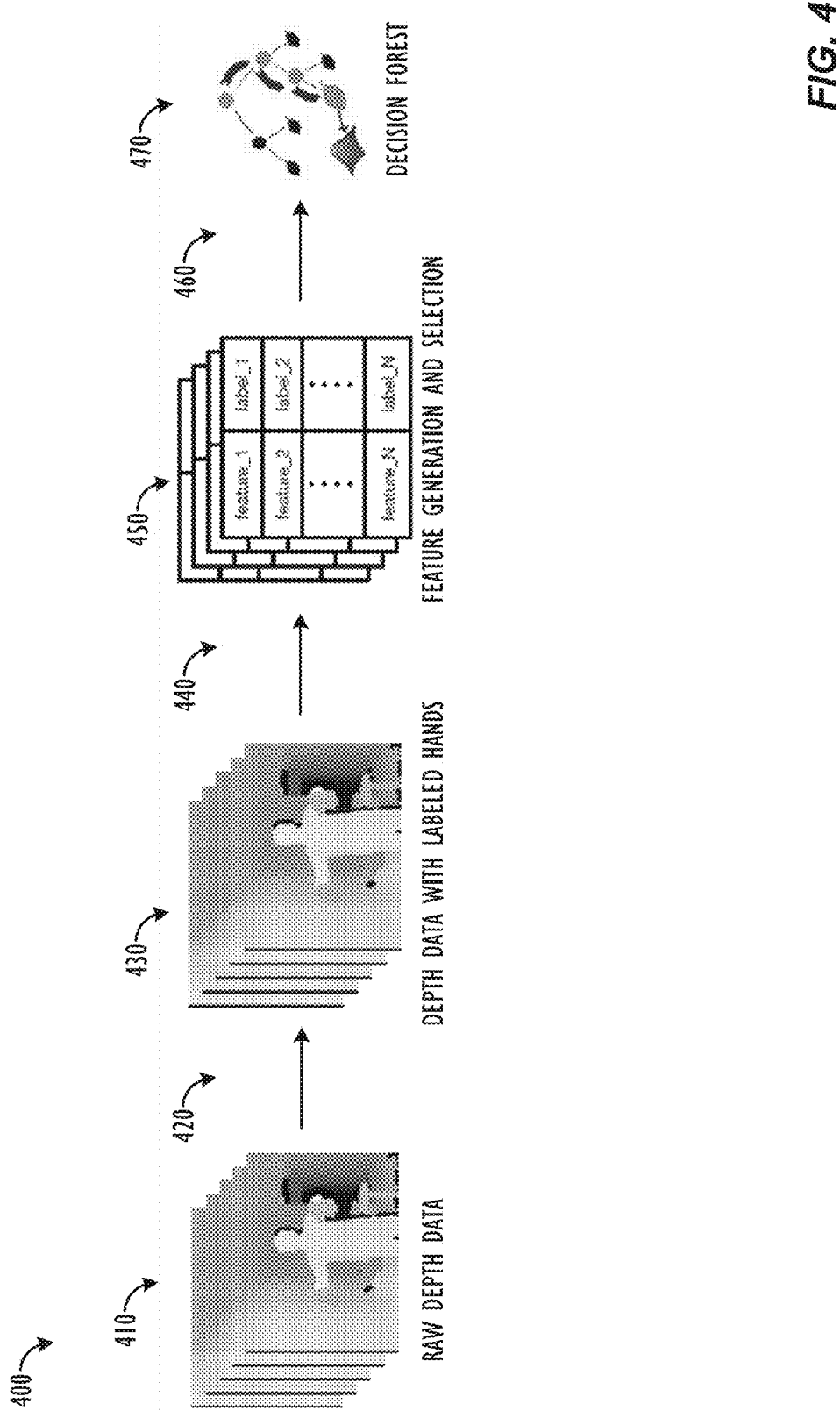
FIG. 4 illustrates an exemplary process for performing offline training of a random forest hand detector, in accordance with some embodiments.

FIG. 4 illustrates an exemplary process 400 for performing offline training of a random forest hand detector, in accordance with some embodiments. The training process may begin at step 410 by acquiring a set of raw depth data images. Then, labeling tools may be utilized at step 420, resulting in a set of depth data images with labeled hands 430. Next, at step 440, the possible hand variations may be captured by training a hand detector, resulting in a set of labeled features 450. The features (i.e., feature_1 . . . feature_N) may represent various types and combinations of pixel pair features with different offsets, such as those features shown in FIGS. 1A and 1B. The labels may be binary labels, such as '0' if the pixel under test is not a part of a hand or '1' if the pixel under test is a part of a hand. At step 460, these features may be used to train a random decision forest 470. In some embodiments, the feature pattern having the least amount of uncertainty at a current node may be used as the feature for the current node in the decision forest.

Figure 5:
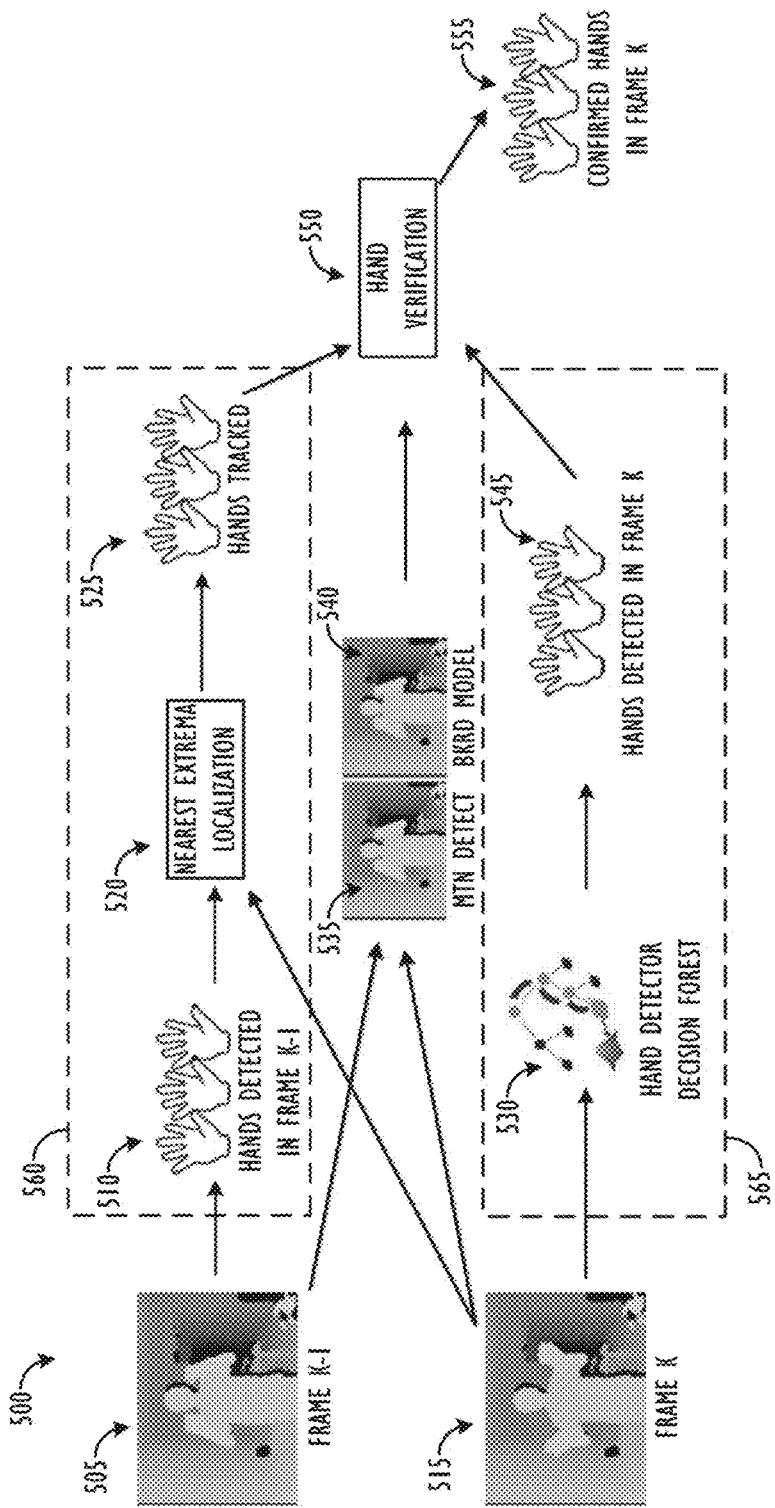
FIG. 5 illustrates an exemplary process for performing three dimensional hand tracking using depth sequences, in accordance with some embodiments.

FIG. 5 illustrates an exemplary process 500 for performing three dimensional hand tracking using depth sequences, in accordance with some embodiments. First, the depth image for a previous frame (Frame K−1) is analyzed at Step 505. The depth image data for the previous frame may simultaneously be passed to tracking process 560 as well as motion detection process 535 and background modeling process 540 for further verification. Within tracking process 560, the set of hands detected in the Frame K−1 are obtained 510. Next, as described above with regard to FIG. 3B, the hands from Frame K−1 and Frame K (i.e., the "current frame") may be subjected to a nearest extrema localization constraint 520, which effectively searches the area surrounding the location of the hand in the previous frame and constrains any hand candidate that is detected in the frame to be located at the nearest extrema of a foreground body object, otherwise it can be discarded. The hands that pass the nearest extrema localization constraint at step 520 are the confirmed set of hands that will be tracked 525 from Frame K−1.

Like the previous frame (Frame K−1), the information from the current frame (Frame K) may be passed to motion detection process 535 and background modeling process 540. The result of processing the previous and current frame using motion detection process 535 and background modeling process 540 is that the portions of the frames where a valid hand may be tracked are limited to only "moving pixel areas" within the frame, as well as pixels that are deemed "foreground pixels" within the frame. These two constraints come from the insight that true positive hands in received images are almost always both in the foreground, as well as moving. (Note: the motion detection process 535 and background modeling process 540 may "look back" a set number of frames, e.g., a few seconds' worth of frames, to determine whether there is a high enough probability of movement in a particular region of the image to deem it a "motion region" or a "background region.")

Finally, each frame, as it becomes the "current frame," is subjected to the hand detection process 565, which may involve the background-invariant hand detector decision forest 530 discussed in greater detail above, resulting in a set of candidate hands 545 detected in the "current frame," Frame K. Note that there may be some new hands in Frame K that were not present in Frame K−1, or some hands that were present in Frame K−1 that are not present in Frame K. This output of current frame hand detection process 565 is then passed to hand verification stage 550, along with: 1.) the output of motion detection process 535 and background modeling process 540 that limit the potential parts of the frame where valid hands can appear to the moving portions of the foreground; and 2.) the output of the hand tracker 560 from the previous frame.

At hand verification step 550, the detected (545) and tracked (525) hand candidates are again verified to make sure that they are likely to be hands. This process again leverages the fact that the hand is most often attached to the body with "single directional connectivity," i.e., located at the end of an arm that is connected to the user's body via only a single connection point. This "single directional connectivity" check may be implemented by drawing a circle around the detected hand and checking the intersections with the foreground body mass of the user whose hand has been detected. If the detected hand is indeed a real hand, there will only be an intersection with the foreground body mass in one direction.

Additional verification steps would include ruling out candidate hands located in the background of the scene or in regions of the scene where there has not been any movement over a predetermined amount of time. Finally, hands may be verified by tracking their IDs from frame to frame and removing those hands in the current frame that show unusual movement characteristics. For example, if there are two hands in the frame for many consecutive frames, and then there are suddenly six hands in the current frame, there is a high likelihood that four additional hands in the current frame may be false positives. Likewise, if Hand #1 has been on the left side of an image for many consecutive frames and Hand #2 has been on the right side of an image for many consecutive frames, it is unlikely that, in the current frame, either Hand #1 or Hand #2 would suddenly move all the way across to the other side of the image (i.e., move more than the distance by which a human subject could typically move their hands in the time it took the image sensor to capture the successive frames). Finally, those hand candidates that pass the hand verification step 550 are output as confirmed hands in the current frame, Frame K, 555.

Figure 6A:
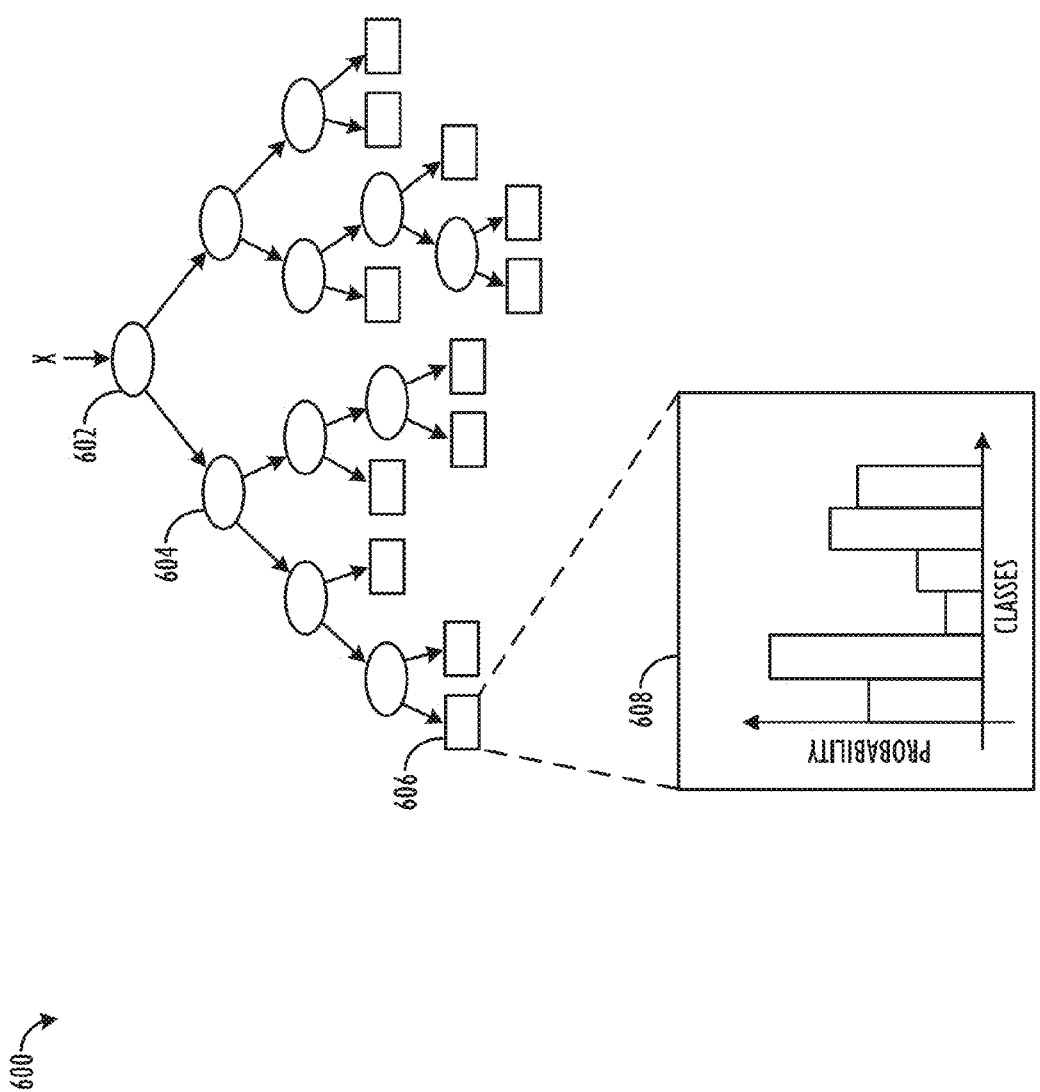
FIG. 6A illustrates an exemplary random decision tree from an exemplary random decision forest, in accordance with some embodiments.

FIG. 6A illustrates an exemplary random decision tree 600 from an exemplary random decision forest, in accordance with some embodiments, e.g., the random decision forest 470 that is created during the hand detector training process or the random decision forest 530 that is used during the hand detection process once it has been trained. Each decision tree comprises a root node (e.g., root node 602 of decision tree 600), a plurality of internal nodes, called split nodes (e.g., split node 604 of decision tree 600), and a plurality of leaf nodes (e.g., leaf node 606 of decision tree 600).

In operation, each root and split node of each tree performs a binary test on the input data and, based on the result, directs the data to the left or right child node. The leaf nodes do not perform any action; they just store probability distributions (e.g., example probability distribution 608 for a leaf node of decision tree 600 of FIG. 6A).

Once all the nodes in the tree have been trained to determine the parameters for the binary test maximizing the information gain at each split node, and leaf nodes have been selected to terminate each branch, then probability distributions can be determined for all the leaf nodes of the tree. This may be achieved by counting the class labels of the training image elements that reach each of the leaf nodes. All the image elements from all of the training images end up at a leaf node of a tree. As each image element of the training images has a class label associated with it, a total number of image elements in each class can be counted at each leaf node. From the number of image elements in each class at a leaf node and the total number of image elements at that leaf node, a probability distribution for the classes at that leaf node can be generated. To generate the distribution, the histogram may be normalized.

An example probability distribution 608 is shown illustrated in FIG. 6A for leaf node 606. The probability distribution shows the classes, c, of image elements against the probability of an image element belonging to that class at that leaf node, denoted as $P_{lt(x)}(Y(x)=c)$, where $l_t$ indicates the leaf node l of the $t^{th}$ tree. In other words, the leaf nodes store the posterior probabilities over the classes being trained. Such a probability distribution can therefore be used to determine the likelihood of an image element reaching that leaf node belonging to a given classification, e.g., wrist, index fingertip, etc. (if the tree is designed to detect such classes). In other embodiments, only a single class, such as "hand" may be detected, thus negating the need for the classification probability distribution histogram.

Figure 6B:
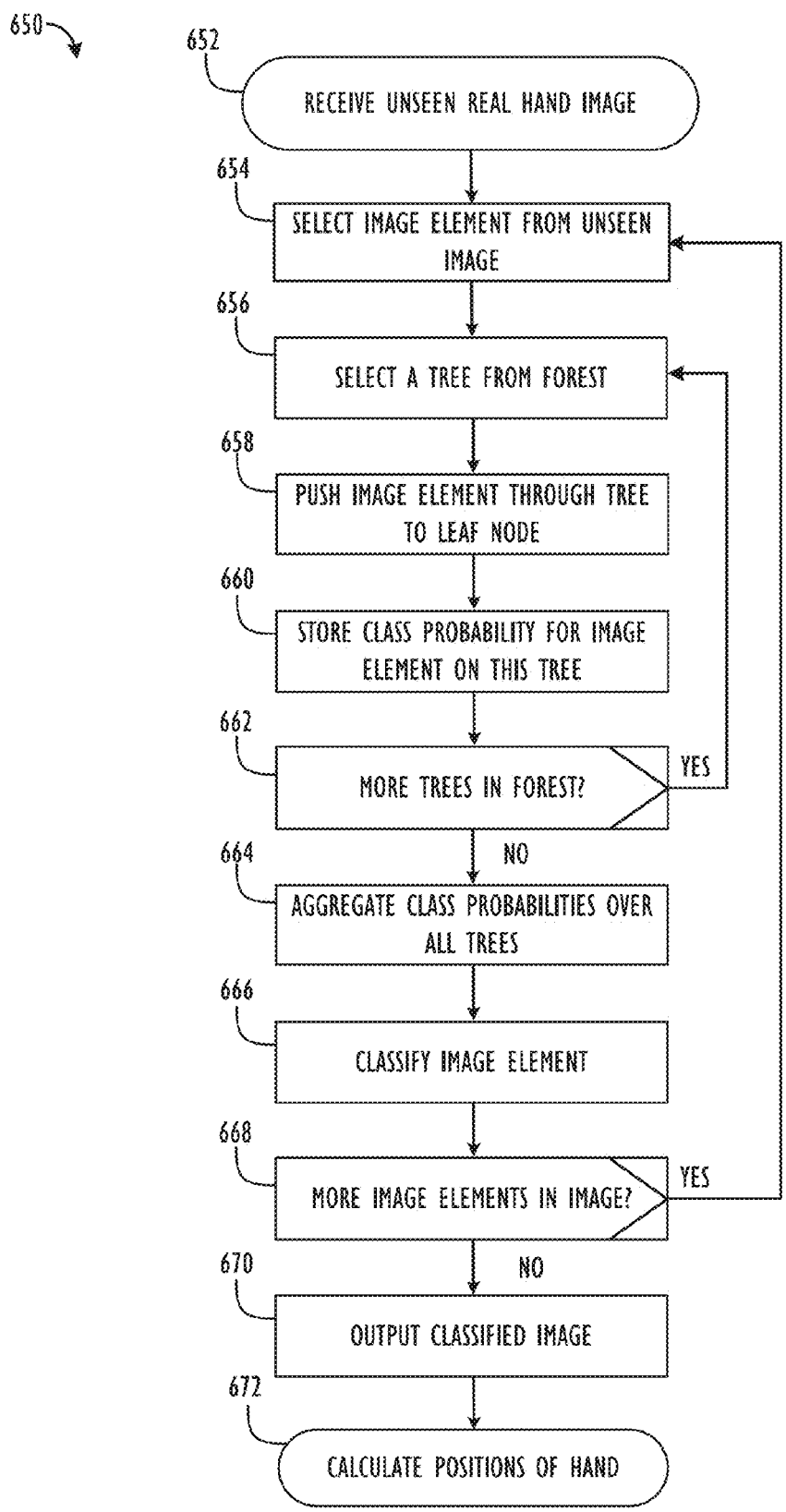
FIG. 6B illustrates a flowchart of a process for classifying pixel points on a user's hand, in accordance with one embodiment.

FIG. 6B illustrates a flowchart of a process 650 for classifying pixel points on a user's hand, in accordance with one embodiment. First, an unseen image of a user's hand (i.e., a real hand image) is received 652 at the classification algorithm. An image is referred to as 'unseen' to distinguish it from a training image which has the image elements already classified.

An image element from the unseen image is selected 654 for classification. A trained decision tree from the decision forest is also selected 656. The selected image element is pushed 658 through the selected decision tree, such that it is tested against the trained parameters at a node, and then passed to the appropriate child in dependence on the outcome of the test, and the process repeated until the image element reaches a leaf node. Once the image element reaches a leaf node, the probability distribution associated with this leaf node is stored 660 for this image element.

If it is determined 662 that there are more decision trees in the forest, then a new decision tree is selected 656, the image element pushed 658 through the tree and the probability distribution stored 660. This is repeated until it has been performed for all the decision trees in the forest.

Once the image element has been pushed through all the trees in the decision forest, then a plurality of classification probability distributions have been stored for the image element (at least one from each tree). These probability distributions are then aggregated 664 to form an overall probability distribution for the image element. In one example, the overall probability distribution is the mean of all the individual probability distributions from the T different decision trees.

Once the overall probability distribution is determined, the overall classification of the image element is calculated 666 and stored. The calculated classification for the image element is assigned to the image element for future use. In addition, the maximum probability can optionally be compared to a threshold minimum value, such that an image element having class c is considered to be present if the maximum probability is greater than the threshold.

It is then determined 668 whether further unanalyzed image elements are present in the unseen depth image, and if so another image element is selected and the process repeated. Once all the image elements in the unseen image have been analyzed, then classifications are obtained for all image elements, and the classified image is output 670. The classified image can then be used to calculate 672 the positions of the hand.

FIG. 7A illustrates an exemplary located hand candidate, in accordance with one embodiment. In image 700, the center of the hand candidate is determined to be located at point 720, with the presumed hand boundary indicated by box 710. Image 700 is an example of the appearance of a depth map before background segmentation has occurred.

FIG. 7B illustrates exemplary sample pixel pairs used to compute depth difference features from a depth map using a background-segmented input image 750, in accordance with one embodiment. Central point 760 is shown being compared to point 770 (in the foreground) to compute a first exemplary feature and to exemplary point 780 (in the background) to compute a second exemplary feature.

Figure 8:
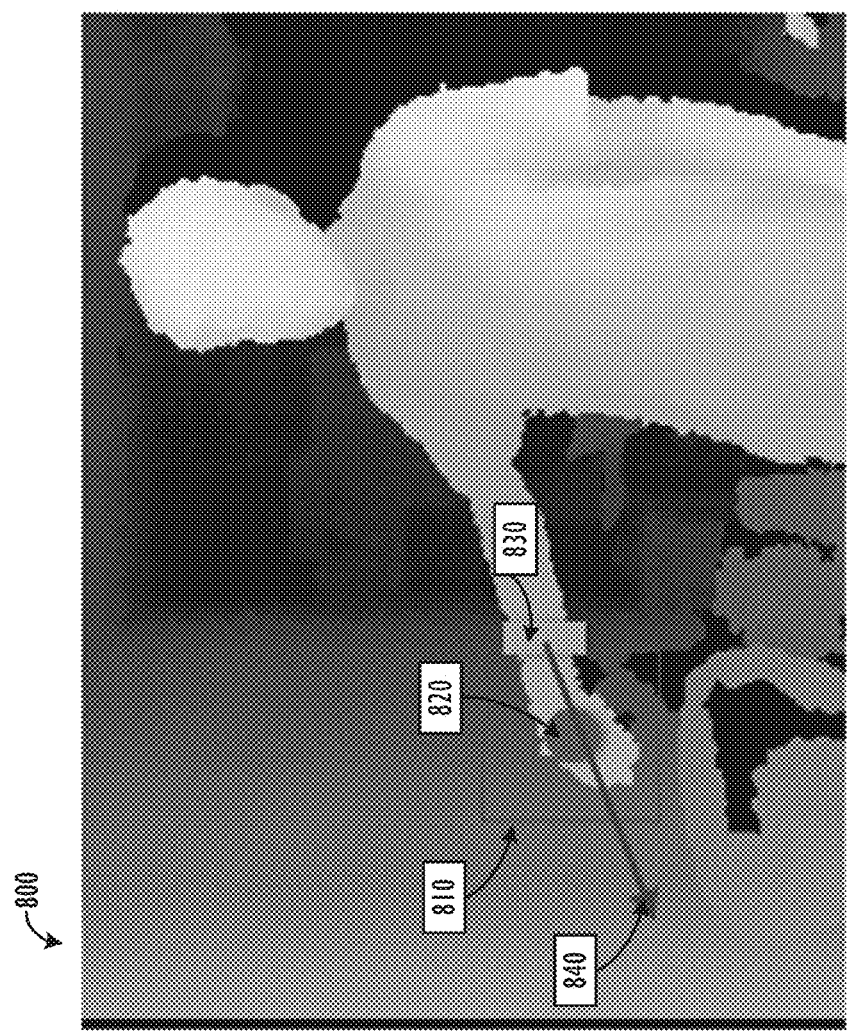
FIG. 8 illustrates an exemplary located hand candidate that is at an xy-plane extrema and shows single-directional connectivity with the body/torso mass of the user, in accordance with one embodiment.

FIG. 8 illustrates an exemplary located hand candidate 820 inside bounding box 810 that is at an xy-plane extrema of the depth map 800. The extrema in FIG. 8 was found by tracking along path 840 towards the user's hand. FIG. 8 also illustrates single-directional connectivity (via wrist 830) with the body/torso mass of the user, which may be used as another factor in the hand verification process described above in reference to FIG. 5. In some embodiments, an additional constraint may be placed upon the maximum pairwise distance of the boundaries between the foreground/background transitions of the component that connects the candidate hand to the user's body (e.g., the top point and bottom point of wrist rectangle 830 in FIG. 8). For example, a distance, such as 100 mm (representative of a loose upper bound of typical user arm width), may be used as the maximum pairwise distance allowed in a valid single-direction connection between the user's hand and body.

Figure 9A:
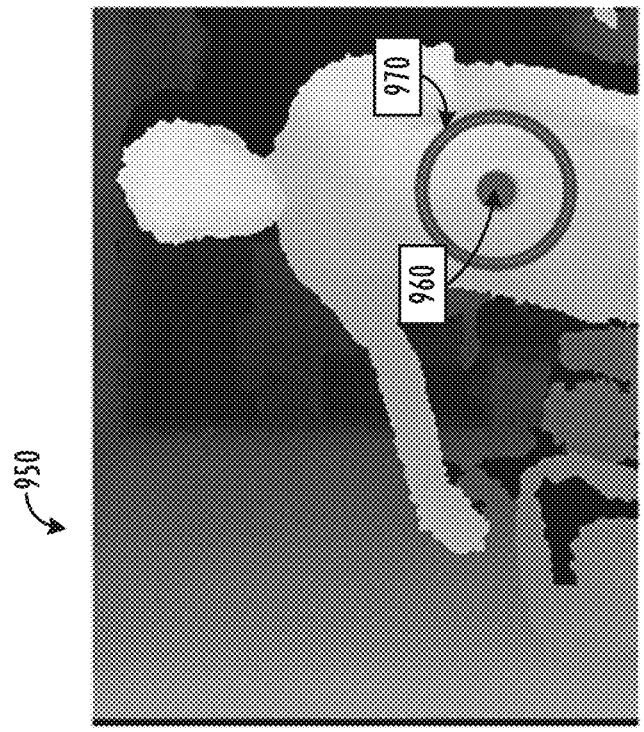
FIG. 9A illustrates an exemplary located hand candidate that is not at an xy-plane extrema and shows bi-directional connectivity with the body/torso mass of the user, in accordance with one embodiment.

FIG. 9A illustrates an exemplary located hand candidate 910 that is not at an xy-plane extrema of depth map 900 and shows bi-directional connectivity (via wrist 920a and arm 920b) with the body/torso mass of the user. As described above in reference to the hand verification process of FIG. 5, bi-directional connectivity may be used as another factor in determining that a located hand candidate is, in fact, a false positive.

Figure 9B:
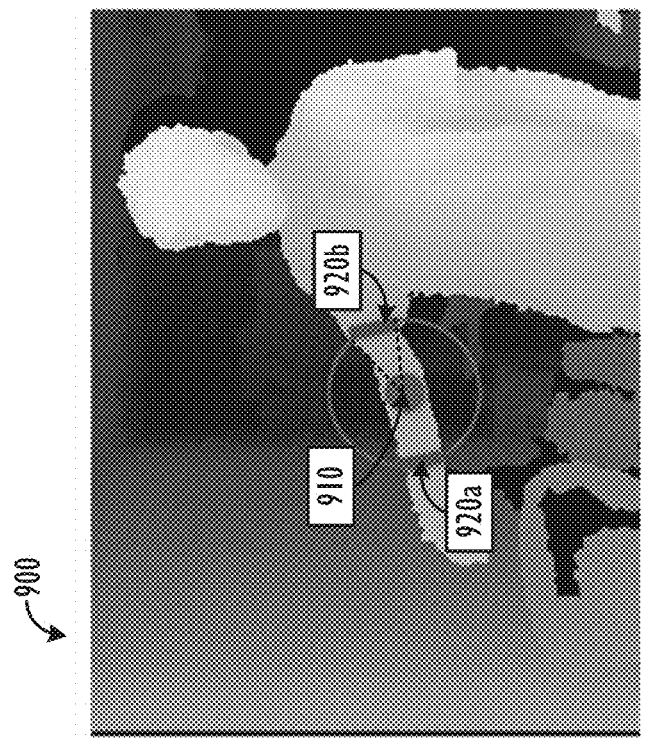
FIG. 9B illustrates an exemplary located hand candidate that is not at an xy-plane extrema and shows no directional connectivity with the body/torso mass of the user, in accordance with one embodiment.

FIG. 9B illustrates an exemplary located hand candidate 960 that is not at an xy-plane extrema of depth map 950 and shows no directional connectivity (i.e., the entire circumference of circle 970 intersects with the body/torso mass of the user). As described above in reference to the hand verification process of FIG. 5, lack of directional connectivity may be used as another factor in determining that a located hand candidate is, in fact, a false positive. The radius of circle 970 may be set as a suitable constant value determined form the known range of normal physical hand sizes.

Figure 10:
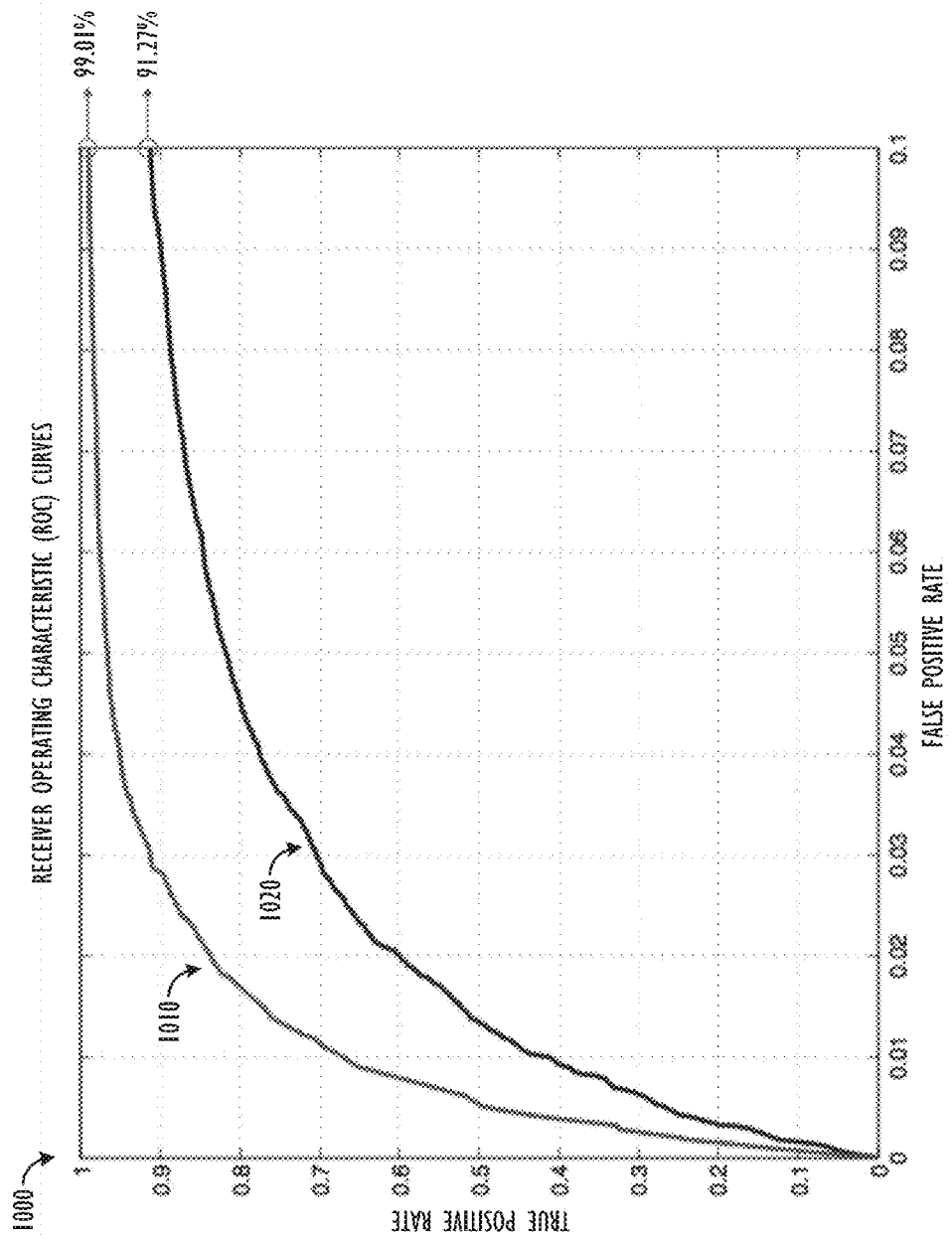
FIG. 10 illustrates Receiver Operating Characteristic (ROC) curves for a prior art hand tracking solution and the hand tracking solution of the present patent application.

FIG. 10 is a graph 1000 that illustrates Receiver Operating Characteristic (ROC) curves for a prior art hand tracking solution 1020 described in Shotten et al., "Real-time human pose recognition in parts from single depth images," Computer Vision and Pattern Recognition (CVPR), 2011 IEEE Conference on DOI, pp. 1297-1304 (2011) (hereinafter "Shotton") and the hand tracking solution 1010 of the present patent application. As may be appreciated, the hand tracking solution 1010 of the present patent application reaches a higher "true positive rate" at lower corresponding "false positive rate" than prior art hand tracking solution 1020. Further, the hand tracking solution 1010 of the present patent application plateaus at a 99.01% "true positive rate"

at "false positive rates" of greater than 10%, as compared to a 91.27% "true positive rate" with prior art hand tracking solution 1020.

Figure 11:
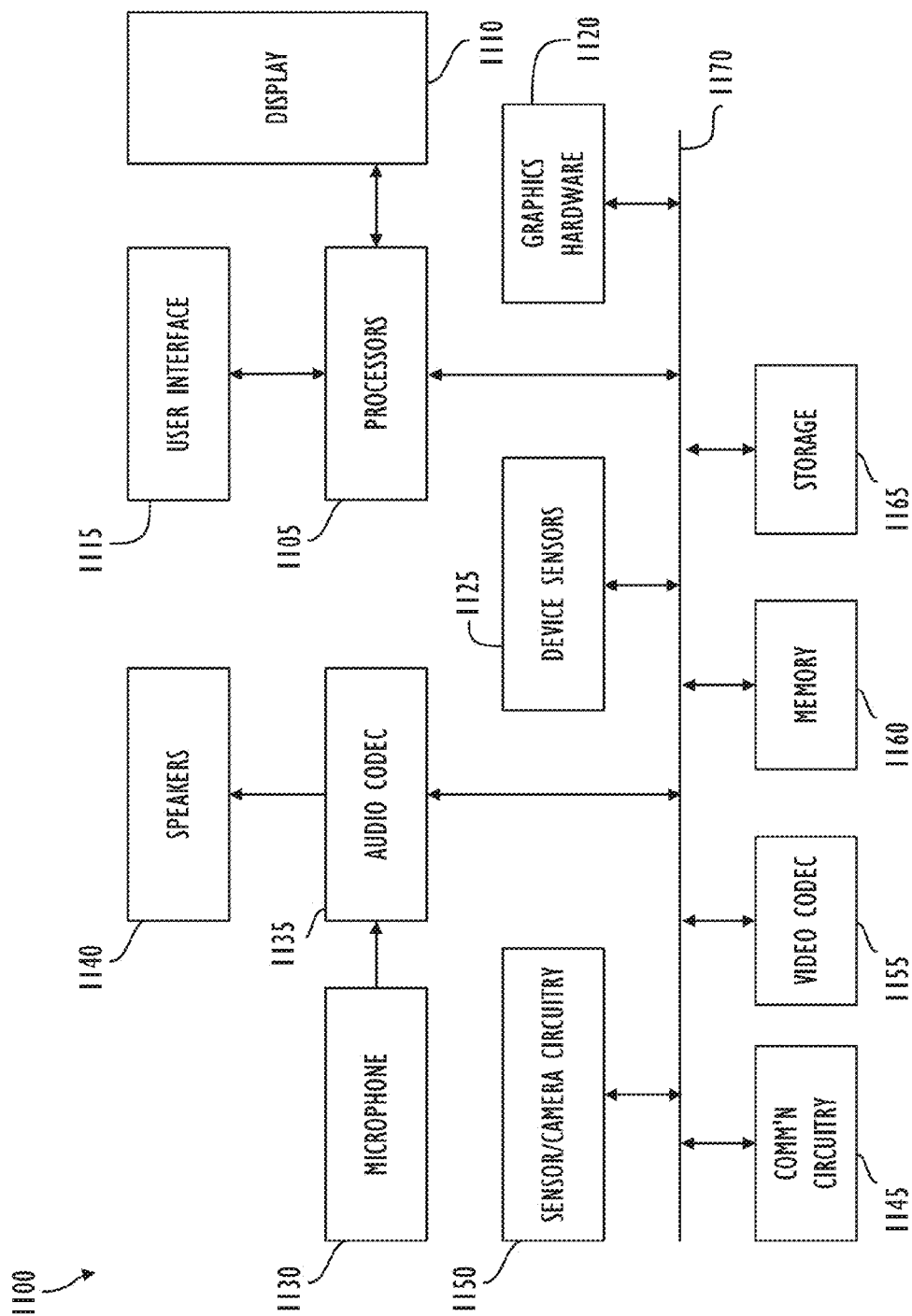
FIG. 11 illustrates a simplified functional block diagram of an illustrative electronic image capture and display device, according to one embodiment.

FIG. 11 is a simplified functional block diagram of an illustrative electronic device for image capture and display, according to one embodiment. Electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture unit 1150, video codec(s) 1155, memory 1160, storage 1165, and communications bus 1170. Electronic device 1100 may be, for example, a personal digital assistant (PDA), personal music player, a mobile telephone, or a notebook, laptop or tablet computer system.

Processor 1105 may execute instructions necessary to carry out or control the operation of many functions performed by device 1100. Processor 1105 may, for instance, drive display 1110 and receive user input from user interface 1115. User interface 1115 can take a variety of forms, such as a button, keypad, dial, a click wheel, keyboard, display screen and/or a touch screen. Processor 1105 may be a system-on-chip such as those found in mobile devices and include a dedicated graphics processing unit (GPU). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 process graphics information. In one embodiment, graphics hardware 1120 may include a programmable graphics processing unit (GPU).

Sensor and camera circuitry 1150 may comprise a still image camera, video camera, and/or depth-sensing camera (e.g., a time-of-flight (ToF) camera, stereo camera, structured light camera, or Lidar system), and may be used to capture still and video images—or depth sequences—that may be processed in order to generate images or depth maps, in accordance with this disclosure. Output from camera circuitry 1150 may be processed, at least in part, by video codec(s) 1155 and/or processor 1105 and/or graphics hardware 1120, and/or a dedicated image processing unit incorporated within circuitry 1150. Images so captured may be stored in memory 1160 and/or storage 1165. Memory 1160 may include one or more different types of media used by processor 1105, graphics hardware 1120, and image capture circuitry 1150 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1160 and storage 1165 may be used to retain computer program instructions or code organized into one or more modules and written in any desired computer programming language. When executed by, for example, processor 1105 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. An apparatus, comprising:
a depth-sensing camera;
a memory having, stored therein, computer program code; and
one or more processing units operatively coupled to the memory and configured to execute instructions in the computer program code that cause the one or more processing units to:
receive a depth map of a scene containing one or more human hands from the depth-sensing camera, the depth map comprising a matrix of pixels, each pixel having a depth value;
extract, from the depth map, features based on the depth values of the pixels in a plurality of patches distributed in respective positions over the one or more human hands, wherein the depth values of the pixels are normalized, such that the features are background-invariant;
match the extracted features to previously-stored features;
estimate a position of at least one of the one or more human hands based, at least in part, on stored information associated with the matched features; and
track the position of the at least one of the one or more human hands,
wherein the instructions to track comprise instructions to track bi-directionally along a z-axis of the scene.

2. The apparatus of claim 1, wherein the features use a constant value for the depth values of background pixels.

3. The apparatus of claim 1, wherein the instructions to match the extracted features to previously-stored features further comprise instructions to use a background-invariant decision forest.

4. The apparatus of claim 1, wherein the instructions to estimate the position of the at least one of the one or more human hands further comprise instructions to disregard pixels that do not exhibit a threshold amount of motion.

5. The apparatus of claim 1, wherein the instructions to estimate the position of the at least one of the one or more human hands further comprise instructions to disregard hands that do not exhibit single-directional connectivity to a human body.

6. The apparatus of claim 1, wherein the instructions to track bi-directionally along a z-axis of the scene further comprise instructions to locate local extrema in the depth map of the scene.

7. The apparatus of claim 1, wherein the instructions to track bi-directionally along a z-axis of the scene further comprise instructions to weight the x-coordinate value and y-value coordinate of the pixels in the plurality of patches.

8. A non-transitory program storage device, readable by a programmable control device and comprising instructions stored thereon to cause one or more processing units to:

receive a depth map of a scene containing one or more human hands from a depth-sensing camera, the depth map comprising a matrix of pixels, each pixel having a depth value;

extract, from the depth map, features based on the depth values of the pixels in a plurality of patches distributed in respective positions over the one or more human hands, wherein the depth values of the pixels are normalized, such that the features are background-invariant;

match the extracted features to previously-stored features;

estimate a position of at least one of the one or more human hands based, at least in part, on stored information associated with the matched features; and track the position of the at least one of the one or more human hands, wherein the instructions to track comprise instructions to track bi-directionally along a z-axis of the scene.

9. The non-transitory program storage device of claim 8, wherein the features use a constant value for the depth values of background pixels.

10. The non-transitory program storage device of claim 8, wherein the instructions to match the extracted features to previously-stored features further comprise instructions to use a background-invariant decision forest.

11. The non-transitory program storage device of claim 8, wherein the instructions to estimate the position of the at least one of the one or more human hands further comprise instructions to disregard pixels that do not exhibit a threshold amount of motion.

12. The non-transitory program storage device of claim 8, wherein the instructions to estimate the position of the at least one of the one or more human hands further comprise instructions to disregard hands that do not exhibit single-directional connectivity to a human body.

13. The non-transitory program storage device of claim 8, wherein the instructions to track bi-directionally along a z-axis of the scene further comprise instructions to locate local extrema in the depth map of the scene.

14. The non-transitory program storage device of claim 8, wherein the instructions to track bi-directionally along a z-axis of the scene further comprise instructions to weight the x-coordinate value and y-value coordinate of the pixels in the plurality of patches.

15. A computer-implemented method, comprising:

receiving a depth map of a scene containing one or more human hands from a depth-sensing camera, the depth map comprising a matrix of pixels, each pixel having a depth value;

extracting, from the depth map, features based on the depth values of the pixels in a plurality of patches distributed in respective positions over the one or more human hands, wherein the depth values of the pixels are normalized, such that the descriptors are background-invariant;

matching the extracted features to previously-stored features;

estimating a position of at least one of the one or more human hands based, at least in part, on stored information associated with the matched features; and tracking the position of the at least one of the one or more human hands, wherein the instructions to track comprise instructions to track bi-directionally along a z-axis of the scene.

16. The computer-implemented method of claim 15, wherein the features use a constant value for the depth values of background pixels.

17. The computer-implemented method of claim 15, wherein estimating the position of the at least one of the one or more human hands further comprises disregarding background pixels and pixels that do not exhibit a threshold amount of motion.

18. The computer-implemented method of claim 15, wherein estimating the position of the at least one of the one or more human hands further comprises disregarding hands that do not exhibit single-directional connectivity to a human body.

19. The computer-implemented method of claim 15, wherein tracking bi-directionally along a z-axis of the scene further comprises locating local extrema in the depth map of the scene.

20. The computer-implemented method of claim 15, wherein tracking bi-directionally along a z-axis of the scene further comprises weighting the x-coordinate value and y-value coordinate of the pixels in the plurality of patches.

* * * * *